Figure 1:
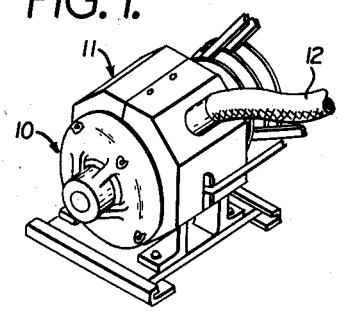

April 23, 1963   M. J. FOWLER ETAL   3,086,348
MEANS FOR DISSIPATING DRIVE MOTOR HEAT
Filed Feb. 20, 1958   5 Sheets-Sheet 1

INVENTORS
ERNST P. NAGEL
MAX J. FOWLER
JAMES B. SMITH
JAMES W. STUART
BY Herman Seid
Robert W. Siddler
ATTORNEYS April 23, 1963 — M. J. FOWLER ETAL — 3,086,348
MEANS FOR DISSIPATING DRIVE MOTOR HEAT
Filed Feb. 20, 1958 — 5 Sheets-Sheet 2

INVENTORS
ERNST P. NAGEL
MAX J. FOWLER
JAMES B. SMITH
JAMES W. STUART
BY Herman Seid
Robert W. Siddler
ATTORNEYS

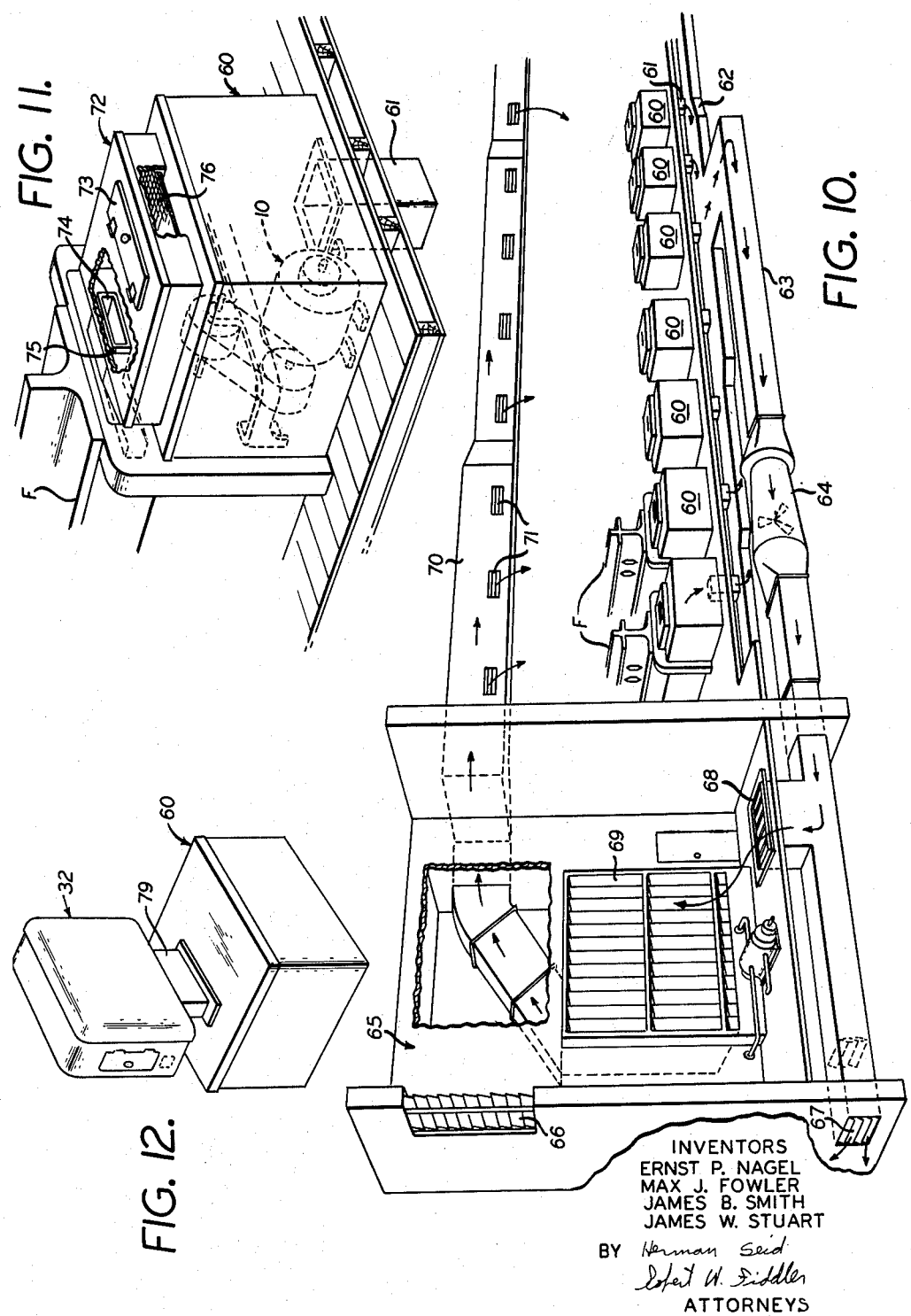

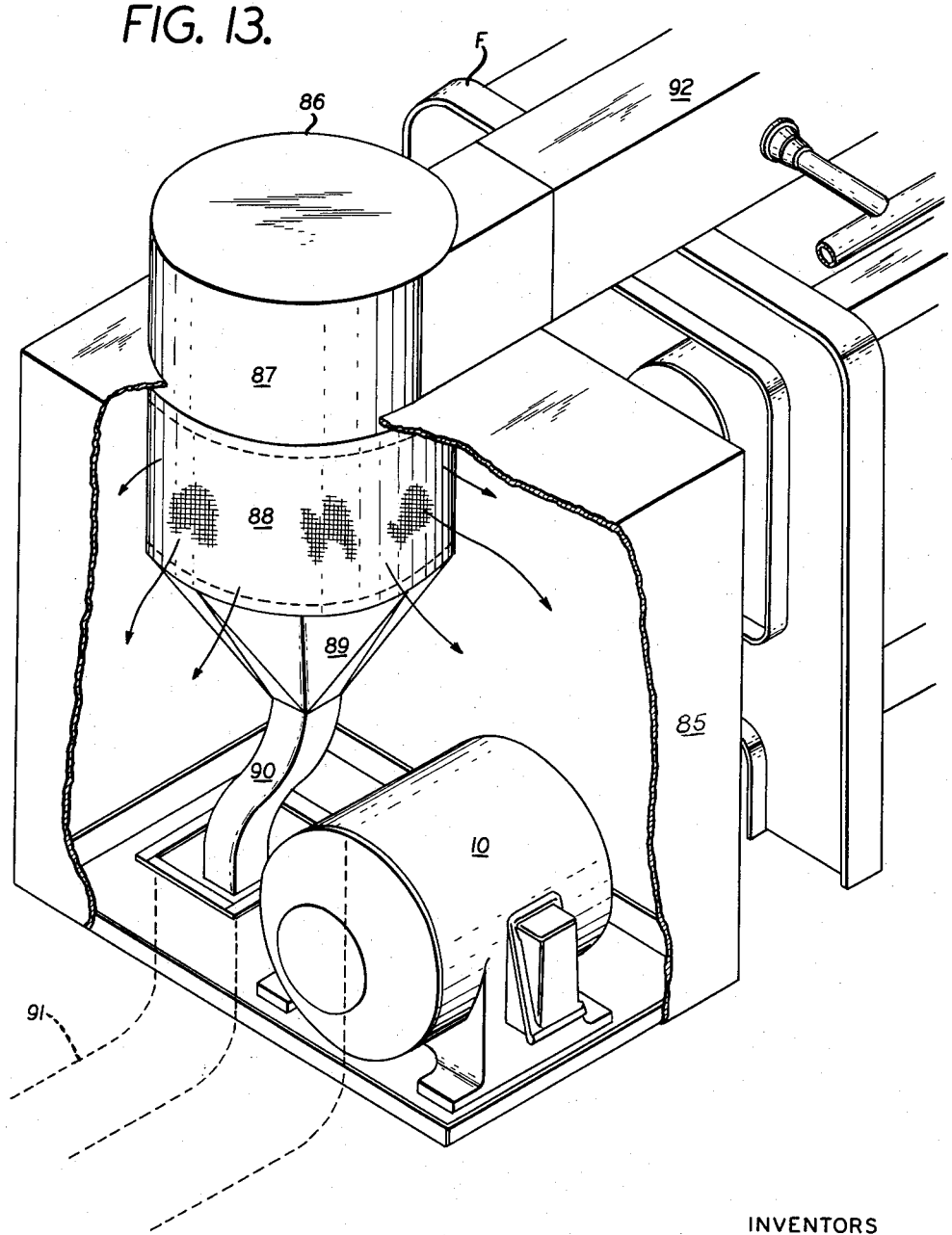

April 23, 1963   M. J. FOWLER ETAL   3,086,348
MEANS FOR DISSIPATING DRIVE MOTOR HEAT
Filed Feb. 20, 1958   5 Sheets-Sheet 5

INVENTORS
ERNST P. NAGEL
MAX J. FOWLER
JAMES B. SMITH
JAMES W. STUART

BY *Herman Seid*
*Robert W. Siddler*
ATTORNEYS

United States Patent Office 3,086,348
Patented Apr. 23, 1963

3,086,348
MEANS FOR DISSIPATING DRIVE MOTOR HEAT
Max J. Fowler, James B. Smith, James W. Stuart, and Ernst P. Nagel, all of Charlotte, N.C., assignors to Pneumafil Corporation, Charlotte, N.C., a corporation of Delaware
Filed Feb. 20, 1958, Ser. No. 716,488
1 Claim. (Cl. 57—56)

This invention relates to textile mill equipment, more particularly to mill equipment permitting cleaning of the mill apparatus, and simultaneous dissipation of the heat produced by the motors conventionally employed for driving said apparatus.

In the fabrication of textile articles, in order to produce goods of a uniform high quality, it is desirable to maintain the mill atmosphere free of foreign material, and of a given relative humidity. Cleaning and humidifying of the mill atmosphere may be accomplished by a variety of air conditioning installations. Thus, during the spinning of textile fibres into yarn, installations of the Pneumafil type have been employed in combination with an air conditioning system. Suction ductwork is arranged along the spinning frame with appropriate intake orifices arranged adjacent the path of travel of the yarn end on the spinning frame, whereby foreign matter such as lint, fly and the like immediately adjacent the yarn may be removed from the atmosphere, and broken yarn ends may be picked up without fouling in the spinning frame. Humidification of the mill atmosphere is generally necessary to permit ready handling of the yarn fibres. Excessive drying of the fibres results in electro-static charges being built up thereon, and fibre brittleness. Excessive moisture causes the hygroscopic yarn to absorb the moisture and sag and stick to the fabricating apparatus. Depending on the textile fabrication operation involved, recommended relative humidities vary between 40 and 80 percent. For the drawing or spinning operations, the relative humidity is found optimum in a range between 45 and 55 percent. Aside from mill atmospheric conditions designed for production of high quality textile goods, it is of course further desirable to maintain atmospheric conditions within a comfort range for the mill operators.

One of the primary sources of the mill heat load is the driving motors employed for driving the relatively large apparatus, such as the spinning frames and the like. These motors generally serve to raise the temperature of the air in the mill, simultaneously lowering the relative humidity. This necessitates the provision of auxiliary humidifying equipment, with a resultant increase in equipment cost. The increased heat load serves further to increase the costs of air conditioning, and subjects the motor to danger of insulation burnout.

It is with the above problems in mind that the present means have been evolved, means providing controlled distribution of the heat produced by the driving motors in a mill, permitting either dissipation of said heat to the ambient atmosphere, or utilization of said heat for maintaining mill temperatures, or some combination of these. The novel motor heat control means are combined with a suction cleaning installation, and/or with an air conditioning system, whereby most efficient use may be made of the available air handling systems.

It is accordingly a primary object of this invention to provide improved mill equipment for aiding control of atmospheric conditions in a mill.

Another object of this invention is to provide textile mill equipment for controlling distribution of the heat produced by the driving motors in a mill.

A further object of this invention is to provide means for facilitating maintenance of humidity conditions at a desired level in a mill.

It is also an object of this invention to provide means for maintaining temperature conditions at a desired level in a textile mill.

An additional object of this invention is to provide temperature and humidity control means in combination with suction cleaning means in a textile mill.

A still further object of this invention is to provide simple, inexpensive and readily maintainable means in a textile mill for facilitating the maintenance of desired atmospheric conditions in the mill.

These and other objects of the invention, which will become apparent from the following specification and claim, are achieved by provision of an air handling system in a textile mill. The air movement produced by the air handling system is employed to remove foreign matter from the apparatus in the mill, and from the mill atmosphere, and for removing the heat generated by the driving motors in the mill. The heated air is thereafter exhausted or redistributed to the mill as desired.

A primary feature of the invention resides in the fact that existing air handling systems, whether employed for air conditioning purposes, and/or suction cleaning purposes, are arranged to permit controlled distribution of the heat generated by the driving motors employed in a mill.

A further feature of this invention resides in the fact that the controlled distribution of the primary heat source of the mill, namely, the drive motors, results in minimizing air conditioning costs, including humidification costs, since, as the air temperature is lowered, the amounts of moisture required to attain a given relative humidity are proportionately lowered.

Figure 4:
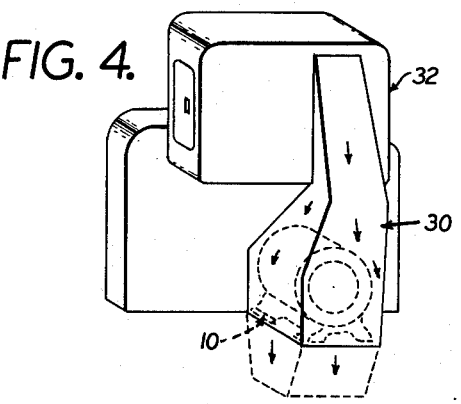
Figure 2:
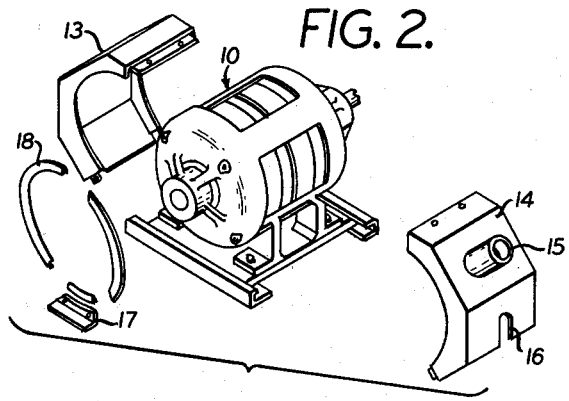
Figure 5:
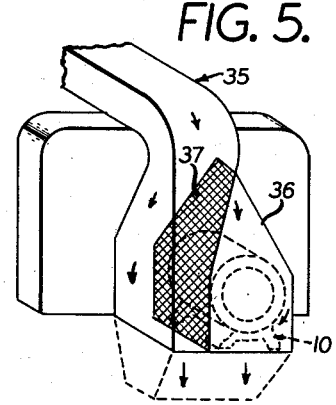
Figure 3:
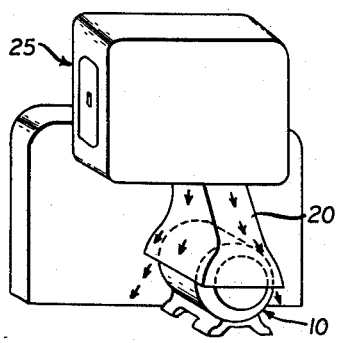
Figure 8:
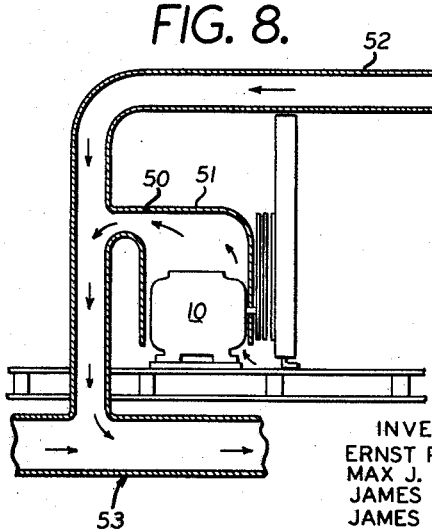
Figure 6:
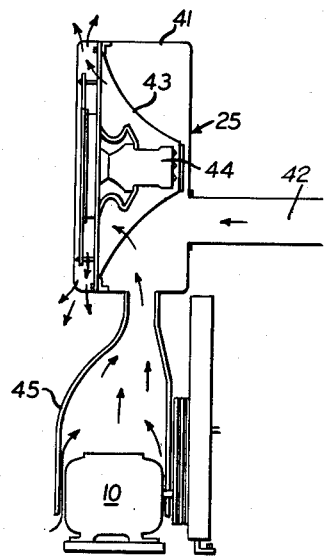
Figure 7:
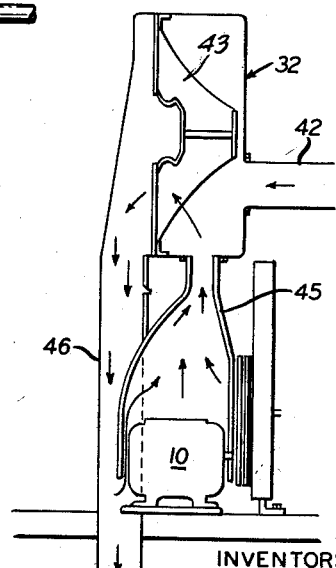
Figure 9:
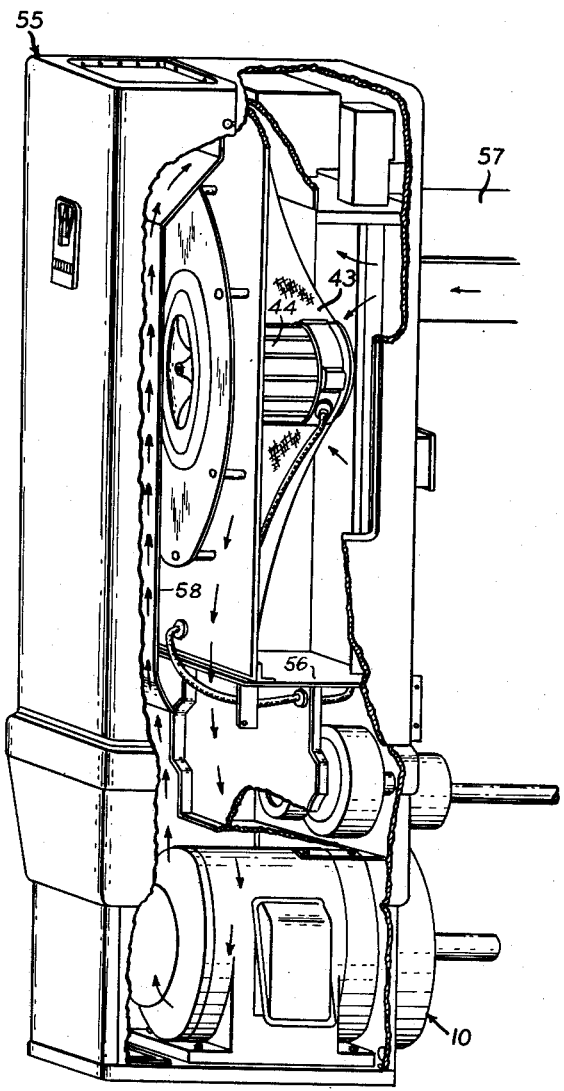
Figure 14:
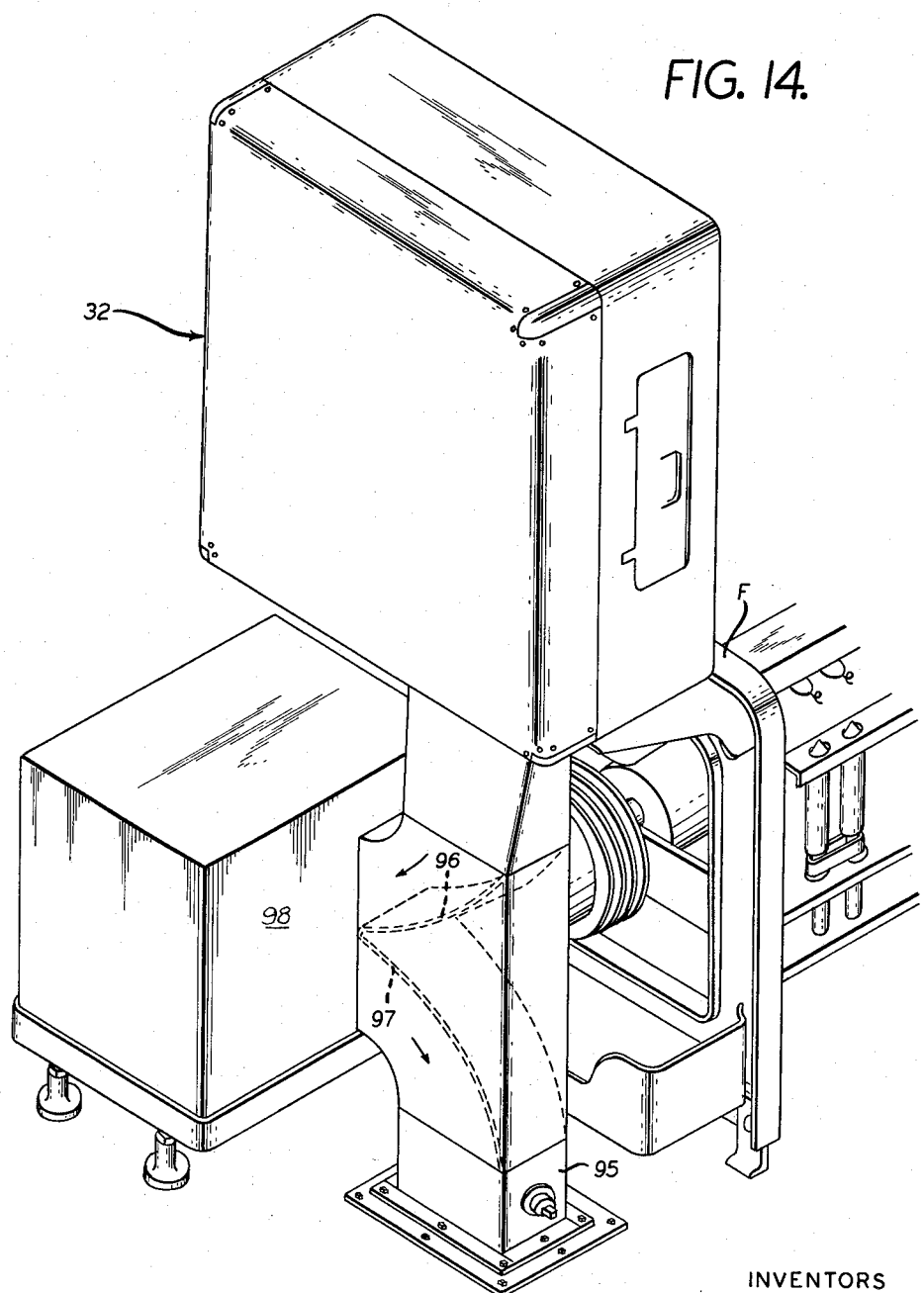

The specific constructional details of a preferred embodiment of this invention, and their mode of functioning, will be made most manifest and particularly pointed out in conjunction with the accompanying drawings, wherein:

FIGURE 1 represents a perspective view of the inventive concept illustrating a suggested arrangement for enclosing a motor so as to permit deflection of the motor heat from the motor alley; and FIGURE 2 is an exploded detail view of the structure shown in FIGURE 1; and FIGURE 3 is a simplified schematic view of the inventive concept as embodied in connection with a textile spinning frame, having an air cleaning system of the unit type in which the air stream is downwardly directed to dissipate motor heat; and FIGURE 4 is a simplified schematic view of the inventive concept as employed in connection with a textile mill having a single air system providing for air flow to accommodate a plurality of spinning frames, each frame having its own material collection equipment; and FIGURE 5 is a simplified schematic illustration of the invention as applied in a textile mill installation, having a single air system and material collection system accommodating a plurality of spinning frames; and FIGURE 6 is a schematic view similar to the unit arrangement of FIGURE 3, illustrating how the inventive concept may be employed to provide induced air flow to insure removal of motor heat from the motor alley; and FIGURE 7 is a view similar to the single air system of FIGURE 4 for attaining the induced flow described in connection with FIGURE 6; and FIGURE 8 is an arrangement similar to the single air and material system of FIGURE 5 attaining the induced flow function described in connection with FIGURE 6; and FIGURE 9 is a perspective view with parts broken away of the invention as embodied in combination with a collector unit of the Pneumafil type; and FIGURE 10 is a perspective schematic view of a typical mill installation having a single air handling system providing air conditioning, and cleaning for a plurality of textile spinning frames; and FIGURE 11 is a perspective detail view of a single frame as seen in FIGURE 10, to which the instant invention has been applied; and FIGURE 12 is a perspective detail view of an alternative arrangement for the collector unit and motor cooling housing, as shown in FIGURE 10; and FIGURE 13 is a perspective view with parts broken away of the invention shown as applied to the single air and material recovery system similar to that shown in FIGURES 5 and 8; and FIGURE 14 illustrates an alternative arrangement functioning in a single air system similarly to the structures illustrated in FIGURES 4 and 7.

Referring now more particularly to the drawings, like numerals in the various figures will be taken to designate like parts. As seen in FIGURES 1 and 2, the inventive concept is illustrated as embodied in a structure permitting removal of motor heat to redirect the removed motor heat to any desired point in the mill. As seen in FIGURE 1, this is accomplished by encasing the motor 10 in a housing enclosure 11 coupled to flexible air hose 12. The novel enclosure 11, here employed, comprises shaped cover plate 13 mating with a hose connecting shaped cover plate 14, cover plate 14 having hose coupling 15 and wire inlet 16 provided therein. Mounting flange 17, as best seen in FIGURE 2, engages with split ring 18 so as to permit assembly of the shaped cover plates 13 and 14 in combination with the motor 10. Hose 12 may then be connected to the negative pressure, intake or suction side, or alternatively the positive pressure, discharge, or high side of any air handling system, so as to insure air flow in the housing 11.

In the embodiment of the invention illustrated in FIGURE 3, the motor 10 is shown arranged in a hood 20 leading from a collector unit 25 of the Pneumafil type, as more fully described in co-pending application S.N. 557,812. Hood 20 is connected to the discharge side of the collector unit 25, so that an air stream is directed through said hood over motor 10, as indicated by the arrows.

In the arrangement illustrated in FIGURE 4, motor 10 is arranged in duct 30 which leads to a central fan (not shown) from a collector unit 32 which screens any foreign matter in the air stream passing through duct 30. The air stream in this arrangement is produced by a fan, not in the collector unit, but centrally located to accommodate a plurality of units as seen in FIGURE 10.

In the embodiment of the invention illustrated in FIGURE 5, duct 35 leads to a central material recovery room (not shown) and directs foreign material collected in the mill area to this room. Where the duct 35 passes motor 10, an air by-pass 36 is arranged to permit a portion of the air stream in duct 35 to be passed through by-pass 36 over motor 10. Screen 37 arranged over the juncture of by-pass 36 and duct 35 prevents passage of any foreign material in duct 35 into the by-pass 36.

In FIGURE 6, the cross sectional elevation illustrates more fully the inventive concept applied to a drive motor 10 for driving a yarn frame (not shown) provided with an installation of the unit Pneumafil type, as previously described in connection with FIGURE 3. The unit Pneumafil collector unit 25 having a housing 41 coupled to collecting duct 42 contains therein a separating screen 43 and a motordriven fan 44. This collector unit 25 is of the type discussed in co-pending application S.N. 557,812. Coupled to the suction side of the collector unit 25 is hood 45 arranged to encase motor 10.

In the embodiment of the invention illustrated in FIGURE 7, the inventive concept is shown employed in connection with a cleaning system in which a central air source is employed for producing a cleaning air stream for use on the various mill equipment. The collector unit 32 is similar to collector unit 25, save for the absence of motor driven fan 44, as in the FIGURE 4 arrangement. The air stream passing through collector unit 32 has any foreign material entrained therein separated out by screen 43. The air stream continues through main return duct 46 to a central fan room (not shown). The motor hood 45 encases the motor 10 and as in the embodiment of the invention illustrated in FIGURE 6, permits the suction of the air heated by the motor into the air stream, as shown by the arrows in the drawing.

In the embodiment of the invention illustrated in FIGURE 8, an alternative arrangement for use in a central air and material system is presented. Motor cooling of motor 10 is accomplished by providing an auxiliary air intake duct 50 coupled to hood 51 surrounding motor 10. Duct 50 connects to the main material collecting duct 52, which leads to header 53. Within these ducts an air stream containing any foreign material removed from the mill equipment is passed to a central separating station where the material is separated from the air stream and returned for further processing to the mill. The air surrounding motor 10 is drawn into this collecting air stream in a manner to become hereinafter more apparent.

In the embodiment of the invention illustrated in FIGURE 9, the inventive concept is shown applied to a unit of the unit Pneumafil type, in which each spinning frame is provided with a collector unit. The drive motor 10 for driving the spinning frame (not shown) is arranged on the floor, and a housing 55 is employed which surrounds the spinning frame motor 10 and the spinning frame drive components. Also arranged within the housing are the collector unit components including screen 43 and motor driven fan 44, as previously discussed and as more fully described in co-pending application S.N. 557,812. The collector unit within housing 55 is formed with a bottom wall 56 and other panelling surfaces to substantially enclose the screen and the fan and separate same from the other members within housing 55. Collecting duct 57 leads to the suction or low pressure side of fan 44, to the right of screen 43, as viewed in the drawing. The air stream set up by fan 44 is downwardly deflected by baffle plate 58 to pass over motor 10 and its related drive elements.

In the embodiment of the invention illustrated in FIGURES 10 and 11, the details of a typical mill installation are more fully revealed. A plurality of spinning frames F are shown schematically with their drive motors encased in enclosure or housing 60. The motor 10 is coupled by conventional drive belt to the drive shaft of the spinning frame. Housing 60 is arranged over this motor and drive. The housing is connected at its lower end to a duct 61, which, as shown, leads through the floor of the mill to a header 62 running beneath the floor. Header 62 leads to main duct 63, having a fan 64 positioned therein to set up an air stream in the direction of the arrows. Main duct 63 then leads to plenum chamber 65, which may contain refrigerating and/or humidifying equipment for producing desired air conditions in the air stream passing therethrough. The plenum chamber 65 is provided with outside air dampers 66, relief dampers 67, intake damper 68, and discharge dampers 69 for a purpose to be made hereinafter more apparent. These dampers may be automatically controlled in a conventional fashion. From the discharge dampers of plenum chamber 65 an air distribution duct 70 is extended back to the mill, and a plurality of discharge louvres 71 is arranged in this duct 70 to distribute the air where desired in the mill area.

Arranged in combination with housing or enclosure 60 is a collector unit 72 of the Pneumafil type, without the fan, having a cleanout door 73 and intake orifice 74 connected to collecting header 75, arranged in combination with spinning frame F to remove lint, fly and the like foreign material from the spinning frame. Collector unit 72 is mounted over housing 60, and functioning to permit the passage of air between the collector unit and the housing, at the same time separating any foreign material collected by the air stream. The air passes out through housing 60 into duct 61.

In the embodiment of the invention illustrated in FIGURE 12, the collector unit employed in FIGURES 10 and 11 is replaced by a collector unit 32 of the type seen in FIGURE 4, without the fan. Collector unit 32 is connected to housing 60 by means of duct 79, which is positioned to receive the air stream after passing through the screen in the collector unit 32.

In the embodiment of the invention illustrated in FIGURE 13, an enclosure or housing 85 is arranged about spinning frame drive motor 10, which is employed for driving spinning frame F. Within the housing a material concentrator 86 of a novel form is arranged. Material concentrator 86 comprises a cylindrical member having a solid upper portion 87 and a foraminous lower portion 88. From foraminous lower portion 88, a transition piece 89 is extended to material handling duct 90, which leads to air duct 91, which as seen, is considerably larger in cross section than material handling duct 90. Leading to the solid portion of concentrator 86 is a header duct 91 of the Pneumafil system.

In the structure illustrated in FIGURE 14, a collector unit 32 of the type previously discussed, having a screen member therein for separating any solid particles in an air stream passing through said collector unit 32, is coupled to duct 95 leading to a centrally located fan (not shown). Deflector plates 96 and 97 in said duct 95 deflect the air stream passing through duct 95 into housing 98 which encloses the drive motor for spinning frame F. The air stream leaving housing 98 is then returned to duct 95, as shown by the arrows in the drawing.

*Operation*

The aforedisclosed structures may be most optimumly employed to dissipate the motor heat conventionally present in the spinning room of a textile mill installation. As disclosed, the novel inventive concept is shown as embodied in a variety of structures combining a suction cleaning installation of the Pneumafil type, with the motor cooling features. Basically, the novel features of the invention are attained by directing an air stream over the spinning frame drive motors, and thereafter conducting this air stream either to the outside, or to some part of the mill where the motor heat will be less objectionable than in the spinning frame motor alleys.

Three types of systems have been disclosed: a unit system, a single fan system, and a single fan and material handling system. For each of the three types of system, two motor cooling arrangements are suggested: a blowing arrangement, and a suction arrangement.

Thus, in FIGURES 3, 6 and 9, a so-called unit system is illustrated, where each suction cleaning installation comprises a Pneumafil collector unit 25, of the unit type, containing a screen 43 and a motor driven fan for inducing an air stream to pass through said screen from the collecting header ducts arranged along the spinning frame. Any foreign matter collected in said header ducts is separated from the air stream by means of screen 43. The air stream produced by fan 44 may be employed for cooling of motor 10 by downwardly directing this air stream over the motor 10, as illustrated in FIGURES 3 and 9, or by sucking air up over the motor, as illustrated in FIGURE 6. In any of these arrangements, the heated motor air is dissipated from the motor alley.

An alternative Pneumafil system employs a central fan producing an air stream which may be employed to provide the requisite air flow for a plurality of collector units arranged on a multiplicity of frames. The novel structure embodying this central fan system combines the central fan system with a motor cooling arrangement, as illustrated in FIGURES 4, 7, 10–12 and 14. In this arrangement, a collector unit 32, as best seen in FIGURE 7, is arranged in combination with a spinning frame, a motor housing, and the central air ducts leading to the central fan, so the air stream produced by the central fan is cleansed of foreign particles by passing through the screen of collector unit 32. The air stream thus produced is employed for cooling of the motor 10 by employing said air stream to move the air immediately surrounding the motor to some other point. As previously noted in the unit systems, this may be done by sucking the motor air into the air stream, or by blowing the motor heat by means of the air stream. In the structures illustrated in FIGURES 4, 10–12 and 14, motor heat is dissipated by blowing the air stream over the motor. In the structure illustrated in FIGURE 7, motor heat is sucked into the air stream. Any of the aforedisclosed central fan systems may be employed with unit type collector units 25 containing a motor driven fan. In this arrangement, the motor driven fan in the collector unit draws air from the spinning frame and discharges the air after it has passed through a screen into the motor enclosure. The central fan system then draws this heated air from the motor enclosure whence it may be distributed as desired, either to the outside, returned to the mill, or directed through an airconditioning system.

An alternative embodiment of the invention combines the motor heat removal structures with a central material and air handling system, in which both material and air from a plurality of spinning frames are conducted to a centrally located station where the material is recovered from the air stream for further reprocessing, as illustrated in FIGURES 5, 8 and 13. In this arrangement, an air stream is produced at some central station, which is employed for collecting lint, fly, and other foreign material from a spinning frame by means of appropriate ductwork arranged on said spinning frame. The air stream along with the collected material is then fed to a central separating station, where the foreign matter is removed from the air stream for reprocessing. The collecting air stream is employed to provide a motor cooling air stream for dissipating the heat of the drive motors driving the spinning frames. This may be done either by diverting a portion of the collecting air stream through a screening material, so as to prevent the passage of foreign matter therethrough, and passing said diverted air stream over the motor, or the requirement for screening may be eliminated by coupling the motor hood to the collecting air stream so as to permit the air in the motor hood to be sucked into the collecting air stream, as illustrated in FIGURE 8.

In the embodiment illustrated in FIGURE 13, the collecting air stream, along with the foreign matter entrained therein, is passed through separator-concentrator 86, where the centrifugal motion of the air stream through cylindrical separator-concentrator 86 centrifuges the solid matter to compact same, whereupon it may be drawn through material duct 90 by a relatively small air quantity. Air is then passed through screen 88 into housing 85 over motor 10. In passing through the screen, it is cleaned to eliminate any foreign matter which might interfere with proper motor operation. The heated motor air is then drawn through duct 91 to the central station.

The structure illustrated in FIGURES 1 and 2 functions in any of the aforedescribed fashions, depending on the point of connection of hose 12 with the air handling system, and the type of air handling system to which connected. It will be observed that the cooling fan conventionally present on the motor draws air in around the shaft and bearings, and discharges same about the periphery of the motor. This discharged air is then dissipated by the air stream set up by the air handling system. It is also proposed to employ the novel structure independently of any air handling system. Thus, the novel housing enclosure 11 confines the air heated by the motor. This heated air, under the influence of the motor cooling fan is directed away from the motor alley through hose 12.

It is thus seen that novel means have been provided for the dissipation of drive motor heat, which may interfere with maintenance of proper temperature and humidity conditions in a textile mill, conditions which must be maintained in order to attain desirable production standards and provide desired comfort working conditions. By employing the air conventionally employed for cleaning purposes in a novel fashion, motor heat may be distributed or dissipated as desired to thereby provide for cooler motor operation, increasing motor life and eliminating hot motor alleys.

The above disclosure has been given by way of illustration and elucidation, and not by way of limitation, and it is desired to protect all embodiments of the herein disclosed inventive concept, within the scope of the appended claim.

What is claimed is:

In a textile mill having a spinning frame, and a drive motor for said spinning frame, apparatus for facilitating the cleaning of the spinning frame and cooling the drive motor, said apparatus comprising: a duct arranged on the spinning frame, said duct carrying an air stream in which lint, fly and the like foreign matter is entrained; a collector unit coupled to said duct; a fan in said collector unit producing the air stream; a screen positioned in said collector unit over said fan to separate any solid particles from the air stream; a housing encasing said collector unit and the spinning frame drive motor; a baffle plate in said housing deflecting the air stream from said collector unit downwardly over the drive motor, and then guiding the air stream upwardly to a discharge orifice in said housing said baffle plate forming a common wall between the upwardly and downwardly directed air streams.

References Cited in the file of this patent

UNITED STATES PATENTS

| | | |
|---|---|---|
| 2,077,283 | Taylor et al. | Apr. 13, 1937 |
| 2,425,577 | Thoma | Aug. 12, 1947 |
| 2,431,726 | Bechtler | Dec. 2, 1947 |
| 2,708,829 | Thoma | May 24, 1955 |
| 2,898,727 | Bahnson | Aug. 11, 1959 |
| 2,946,173 | Bahnson | July 26, 1960 |
| 2,946,174 | Bahnson | July 26, 1960 |

FOREIGN PATENTS

| | | |
|---|---|---|
| 1,073,731 | France | Mar. 24, 1954 |